United States Patent
Hernandez et al.

(10) Patent No.: US 9,628,006 B2
(45) Date of Patent: Apr. 18, 2017

(54) ANGULAR FREQUENCY EXTRACTOR FOR CONTROLLING A BRUSHED DC MOTOR

(71) Applicant: TEXAS INSTRUMENTS INCORPORATED, Dallas, TX (US)

(72) Inventors: David Hernandez, Mexico City (MX); Gregory Charles Amidon, Westfield, IN (US); David John Baldwin, Allen, TX (US); Brandon J. Beckham, Northridge, CA (US)

(73) Assignee: Texas Instruments Incorporated, Dallas, TX (US)

( * ) Notice: Subject to any disclaimer, the term of this patent is extended or adjusted under 35 U.S.C. 154(b) by 93 days.

(21) Appl. No.: 14/613,937

(22) Filed: Feb. 4, 2015

(65) Prior Publication Data

US 2015/0229254 A1 Aug. 13, 2015

Related U.S. Application Data

(60) Provisional application No. 61/937,210, filed on Feb. 7, 2014.

(51) Int. Cl.
 *H02P 7/00* (2016.01)
(52) U.S. Cl.
 CPC .................. *H02P 7/0094* (2013.01)
(58) Field of Classification Search
 CPC .................. H02P 7/00; H02P 7/0094
 USPC ....................................... 318/490
 See application file for complete search history.

(56) References Cited

U.S. PATENT DOCUMENTS

| 4,397,285 A * | 8/1983 | O'Neill | F02D 1/183 |
| | | | 123/435 |
| 5,600,575 A * | 2/1997 | Anticole | H02H 6/005 |
| | | | 330/146 |
| 2010/0171457 A1* | 7/2010 | Letor | G01P 3/48 |
| | | | 318/490 |

(Continued)

FOREIGN PATENT DOCUMENTS

| DE | 3829905 A1 * | 3/1990 | ........... G01D 5/2451 |
| DE | EP 2096414 A1 * | 9/2009 | |
| DE | WO 2009106196 A1 * | 9/2009 | ............. G01D 3/021 |

OTHER PUBLICATIONS

Machine translation EP 2096414 A1.*

(Continued)

*Primary Examiner* — Kawing Chan
(74) *Attorney, Agent, or Firm* — Goutham Kondapalli; Charles A. Brill; Frank D. Cimino

(57) ABSTRACT

An apparatus includes a motor driver configured to drive a motor across a pair of input terminals to the motor and a current sense unit configured to sense the motor's electrical current amplitude. Further, an angular frequency extractor is operatively coupled to the motor driver and the current sense unit and configured to detect discontinuities in the motor's electrical current amplitude. The angular frequency extractor also is configured to determine a time period for one complete revolution of a rotor of the motor and to generate a feedback signal based on the determined period to control an angular frequency of the motor. The feedback signal may be used to adjust how the motor is being driven (e.g., to slow the motor down or speed it up).

21 Claims, 5 Drawing Sheets

(56) References Cited

U.S. PATENT DOCUMENTS

2010/0187937 A1\* 7/2010 Faber ................ H02K 23/26
310/195
2014/0265969 A1 9/2014 Vinay

OTHER PUBLICATIONS

Afjei et al., "Sensorless Speed/Position Control of Brushed DC Motor," IEEE Int. Aegean Conf. on Electrical Machines and Power Electronics, Sep. 2007, pp. 730-732.
Nottelmann, J. B., "Sensor-less Rotation Counting in Brush Commutated DC Motors," IDEAdvance White Paper WP-Feb. 2010.

\* cited by examiner

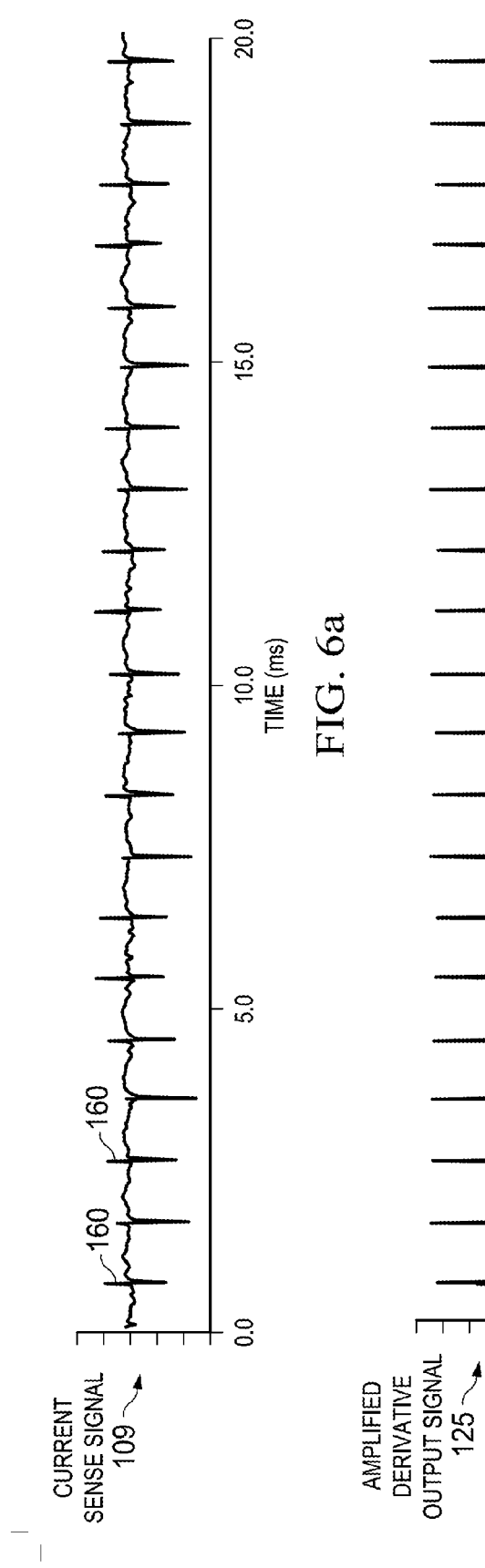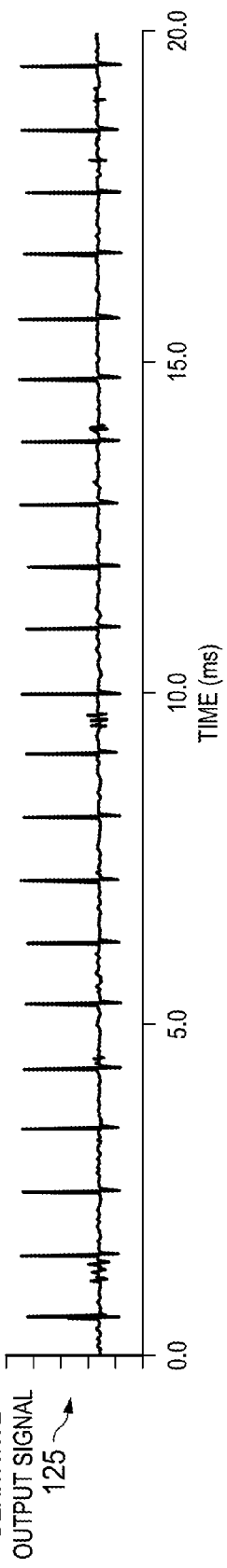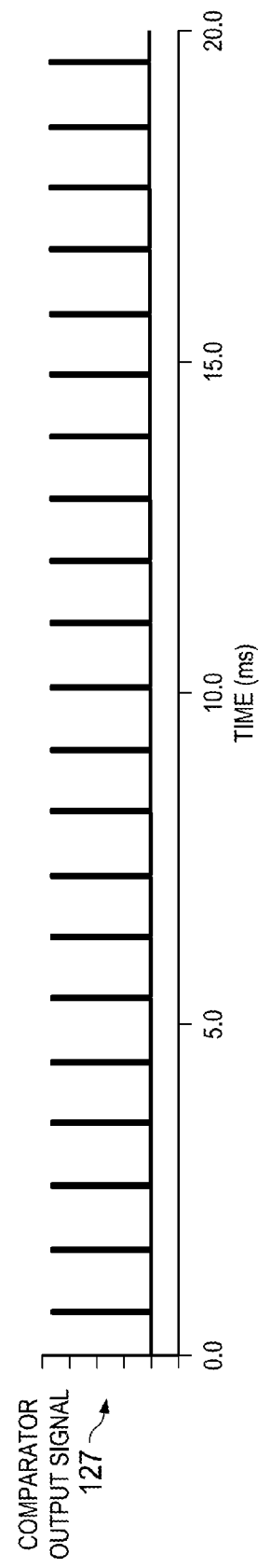

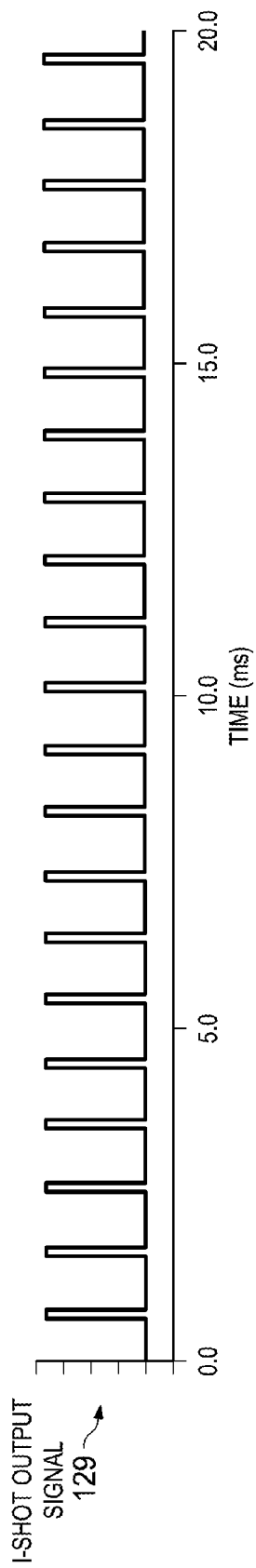
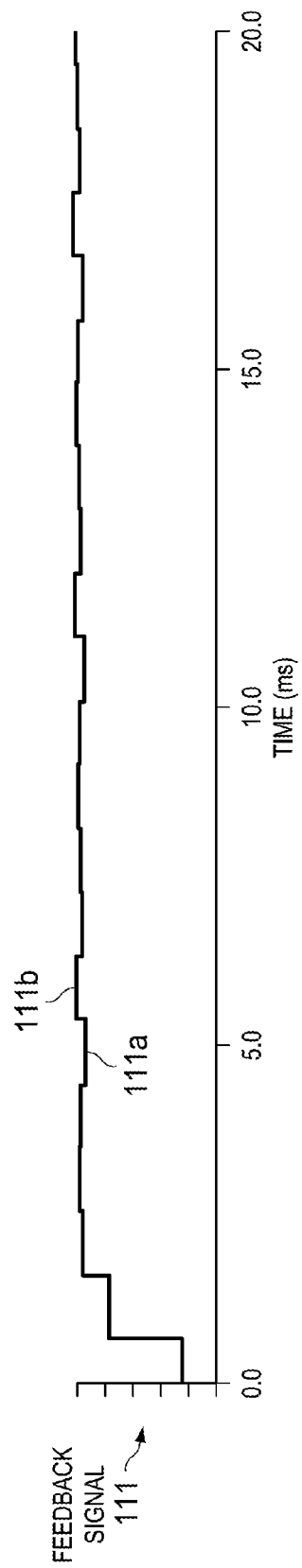

ANGULAR FREQUENCY EXTRACTOR FOR CONTROLLING A BRUSHED DC MOTOR

CROSS-REFERENCE TO RELATED APPLICATIONS

The present application claims priority to U.S. Provisional Patent Application No. 61/937,210, filed Feb. 7, 2014, titled "SENSORLESS ANGULAR FREQUENCY EXTRACTION IN BRUSHED DC MOTORS," which is hereby incorporated herein by reference in its entirety.

BACKGROUND

Direct current (DC) motors are caused to rotate upon application of a DC voltage. Generally, the angular frequency of the motor increases as the applied DC voltage increases. Thus, the angular frequency of the motor can be controlled through the applied DC voltage. DC motors are used for a wide variety of applications. For instance, smart phones may use eccentric rotational mass (ERM) DC motors to cause a vibration for haptic feedback to the user of the phone (e.g., vibration upon receipt of a text message). Numerous other applications exist for DC motors including medical tools, fan control, pump control and toothbrushes.

Some applications for DC motors benefit from tight control of the motor's angular frequency (i.e., speed). Unfortunately, due to manufacturing variations, DC motors of a common type (e.g., same part number) do not all exhibit the same angular frequency for a given DC voltage. Friction, for example, is not a commonly well-controlled parameter and thus affects angular frequency differently from actuator to actuator. Such manufacturing variations may impair the use of DC motors in various applications.

SUMMARY

In one example, an apparatus includes a motor driver configured to drive a motor across a pair of input terminals to the motor and a current sense unit configured to sense the motor's electrical current amplitude. Further, an angular frequency extractor is operatively coupled to the motor driver and the current sense unit and configured to detect discontinuities in the motor's electrical current amplitude. The angular frequency extractor also is configured to determine a time period for one complete revolution of a rotor of the motor and to generate a feedback signal based on the determined period to control an angular frequency of the motor. The feedback signal may be used to adjust how the motor is being driven (e.g., to slow the motor down or speed it up).

In another example, an angular frequency extractor includes a differentiator that is configured to receive a current amplitude signal indicative of the current amplitude of a motor and to generate a derivative output signal based on the received current amplitude signal. The angular frequency extractor in this example also includes an amplifier to amplify the derivative output signal to generate an amplified signal and a comparator to compare the amplified signal to a threshold to generate a comparator output signal. The extractor further includes a one-shot to generate a voltage pulse based each time the comparator's output signal indicates that the amplified signal exceeds the threshold, and a timer to measure the elapsed time between adjacent voltage pulses to thereby generate a feedback signal for use in controlling the motor.

Another example is directed to an apparatus that includes a motor comprising input terminals, a motor driver configured to drive the motor across the input terminals to the motor, a current sense unit configured to sense the motor's electrical current amplitude, and an angular frequency extractor operatively coupled to the motor driver and the current sense unit. The angular frequency extractor preferably is configured to detect discontinuities in the motor's electrical current amplitude and to determine a time period for one complete revolution of a rotor of the motor and to generate a feedback signal based on the determined period to control an angular frequency of the motor. An error generator also is provided and is configured to generate an error signal as an input to the motor driver based on the feedback signal from the angular frequency extractor and a motor control input signal.

A method is also disclosed that includes various operations. The operations include driving a motor and sensing a current amplitude of the motor. The method further includes generating a feedback signal based on the sensed current amplitude and adjusting the driving of the motor based on the feedback signal.

BRIEF DESCRIPTION OF THE DRAWINGS

For a detailed description of exemplary embodiments of the invention, reference will now be made to the accompanying drawings in which:

FIGS. 6a-6e show waveforms illustrating the operation of the illustrative angular frequency extractor of FIG. 3;

DETAILED DESCRIPTION

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Some DC motor control solutions use the motor's back electromotive force (BEMF) voltage to generate a feedback signal for control of the angular frequency of the motor. The BEMF voltage is generally proportional to the angular frequency so controlling the BEMF voltage indirectly permits control of the motor's angular frequency. This approach, however, has several problems. First, the BEMF voltage cannot be measured while the motor is actively being driven by an applied voltage. Thus, periodic temporary cessation of driving the motor is required to use the BEMF voltage approach. Second, measuring the BEMF voltage is not the same as measuring angular frequency because the constant that defines the relationship between BEMF voltage and angular frequency typically is not necessarily known. So, even if the BEMF voltage was measured, the system still could not compute angular frequency without knowing the conversion factor.

Figure 1:
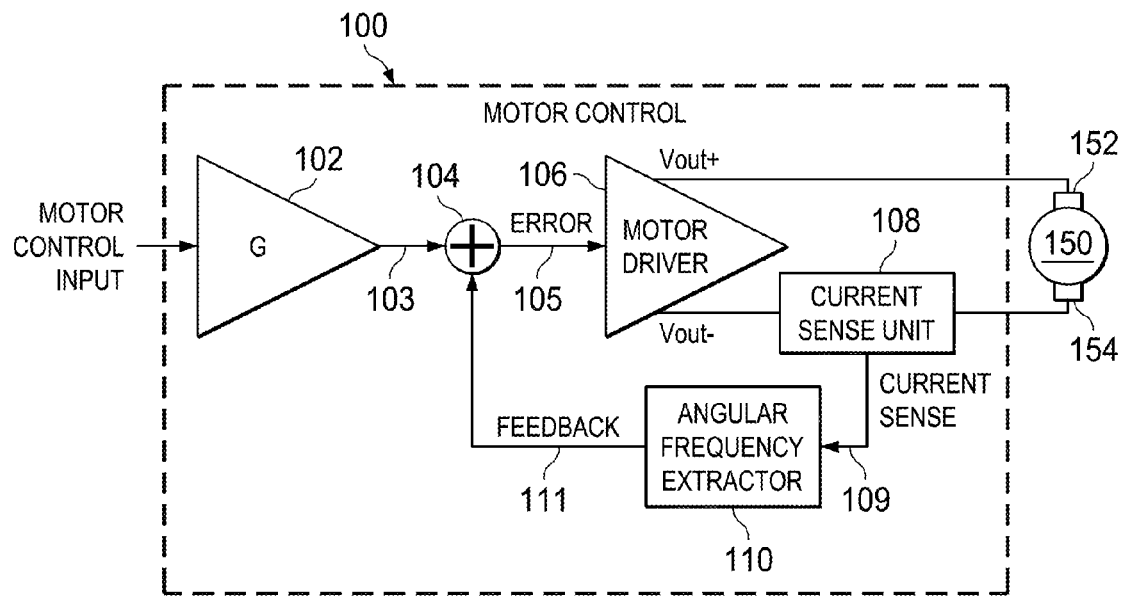
FIG. 1 shows a motor control for driving a motor in accordance with an example.

In accordance with various embodiments, a feedback signal used to control the motor's angular frequency is derived from measurements involving the motor's current amplitude, not the BEMF voltage. FIG. 1 illustrates one such example of a motor control 100 that is configured to drive a motor 150. In the examples disclosed herein, the motor 150 is a brushed DC motor and may be used for any of a wide variety of applications including ERMs (e.g., smart phone haptic user feedback), as well as non-ERM motor applications. The motor control 100 in the example of FIG. 1 includes an input amplifier 102 (with gain G), an error generator 104, a motor driver 106, a current sense unit 108, and an angular frequency extractor 110. The input amplifier 102 receives a motor control input 102 which may be a voltage whose amplitude generally determines the desired angular frequency of the motor. The motor control input 102 is scaled by amplifier 102. The motor driver 106 provides an output voltage via its Vout+ and Vout− to input terminals 152 and 154 of the motor.

The current sense unit 108 senses the motor's electrical current amplitude and provides a current sense signal 109 indicative of the motor's current amplitude to the angular frequency extractor 110. The angular frequency extractor 110 is operatively coupled to the motor driver 106 (e.g., via the error generator 104) and the current sense unit 108. The angular frequency extractor 110 is configured to detect discontinuities in the motor's electrical current amplitude received from the current sense unit 108 by way of current sense signal 109 and to determine a time period for one complete revolution of a rotor of the motor. The angular frequency extractor 110 generates a feedback signal 111 based on the determined period and/or the angular frequency and provides the feedback signal 111 to the error generator 104 to control an angular frequency of the motor 150.

The error generator 104 (which may be implemented as a voltage summer) receives the amplified signal 103 from the input amplifier 102 and generates an error signal 105 as, for example, the difference between the amplified signal 103 and the feedback signal 111 from the angular frequency extractor 110. The error signal 105 causes the angular frequency to be tightly controlled to the target angular frequency specified by the motor control input signal based on the feedback signal 111 derived from the motor's current amplitude.

Figure 2:
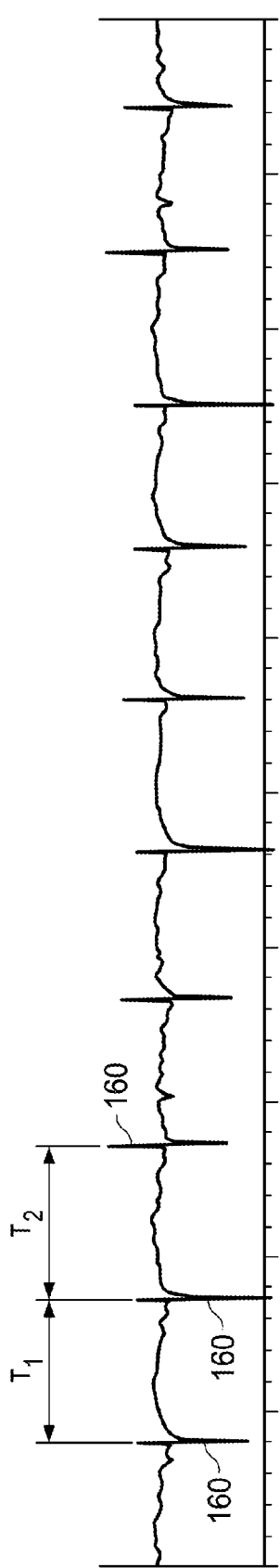
FIG. 2 shows an example of a current waveform depicting amplitude discontinuities that may be used to determine the angular frequency of the motor which may be used as a feedback signal for controlling the motor.

FIG. 2 shows an example of a waveform depicting the time-varying current amplitude of the motor 150, as might be sensed by current sense unit 108. The discontinuities 160 in the waveform are due to the brushes of the brushed DC motor 150 breaking contact with one commutator and making contact with the next commutator as the rotor spins. The elapsed time between adjacent discontinuities 160 (e.g., $T_1$, $T_2$) is a function of the angular frequency of the motor—the faster the motor spins, the smaller the time periods will be between adjacent discontinuities 160. Thus, the time period between adjacent discontinuities 160 can be used, along with knowledge of the number of poles of the motor, to compute the angular frequency of the motor 150. The angular frequency is given by:

$$\text{ANGULAR FREQUENCY} = \frac{1}{\sum_{n=1}^{N} \Delta T_i} \quad (1)$$

where N is the number of poles of the motor and $\Delta T_i$ is the time between the $i^{th}$ discontinuity for a given pole and the discontinuity for the preceding pole.

The angular frequency extractor 110 detects the current amplitude discontinuities 160, measures the elapsed time between adjacent discontinuities (adjacent with respect to time), and computes the time for the motor's rotor to make one complete revolution. From that, the angular frequency can be computed as indicated above. The angular frequency extractor 110 generates the feedback signal 111 based on the period of time determined for the motor's rotor to make one complete revolution. The feedback signal 111 preferably is a voltage that is proportional to the angular frequency of the motor.

The feedback signal 111 is a voltage that is directly or indirectly related to the angular frequency of the spinning motor 150. The angular frequency extractor 110 may actually determine the angular frequency of the motor and generate a voltage based on the determined angular frequency. Alternatively, the angular frequency extractor 110 may determine the period of time required for one complete revolution of the motor's rotor and generate a voltage based on the determined period. Further still, the angular frequency extractor may determine the elapsed time between a single pair of adjacent current amplitude discontinuities and generate a voltage based on that elapsed time.

Figure 3:
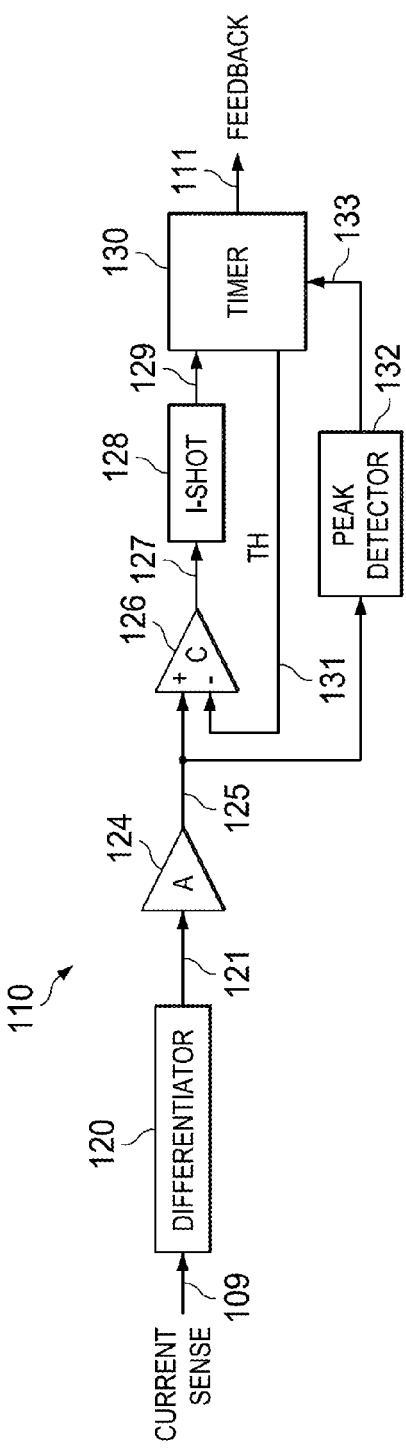
FIG. 3 illustrates an angular frequency extractor in accordance with an example.

FIG. 3 provides an example of an implementation of the angular frequency extractor 110. The angular frequency extractor in this example includes a differentiator 120, an amplifier 124, a comparator 126, a 1-shot 128, a timer 130, and a peak detector 132. The differentiator receives the current sense signal 109 as its input and is coupled to the amplifier 124. The amplifier 124, in turn, is coupled to an input of the comparator 126. The other input of the comparator is a threshold signal 131 received from the timer 130. The comparator's output is coupled to the 1-shot, and the 1-shot is coupled to the timer 130. The peak detector's input is received from the output of the amplifier 124 and the peak detector 132 provides a peak detection signal 133 to the timer 130.

In operation, the differentiator 120 receives the current sense signal 109 from the current sense unit 108 and determines the derivative of the current sense signal to generate a derivative output signal 121. The derivative output signal 121 is amplified by the amplifier 124 and the amplified signal 125 is provided both to the comparator 126 and the peak detector 132. The comparator 126 compares the amplified signal 125 to a threshold (TH) 131 which is generated by the timer 130 based on an output signal 133 from the peak detector. In one example, the threshold 131 is set by the timer 130 to a value that is between the peak value as determined by the peak detector and the baseline current level. In one particular example, the threshold 131 is determined by the timer 132 to be between 0.7 times the peak value and 3 times the root mean square (RMS) value of the noise. The peak detector 132 also may determine the RMS value of the current's noise level. In other embodiments, the threshold 131 is preset and thus the peak detector 132 may not be used or even included.

The comparator output signal 127 is provided to the 1-shot 128 which generates a voltage pulse as 1-shot output signal 129 each time the comparator's output signal 127 indicates that the amplified signal 125 exceeds the threshold 131. The timer 130 measures the amount of time that elapses between adjacent 1-shot voltage pulses, uses those elapsed time values to determine the amount of time the motor 150 takes for its rotor to make one complete revolution, and generates the feedback signal 111 based on the time required for one complete revolution of the motor's rotor. That time period is proportional (e.g., inversely) to the angular frequency and thus the timer's feedback signal output is proportional as well to the motor's angular frequency.

Figure 4:
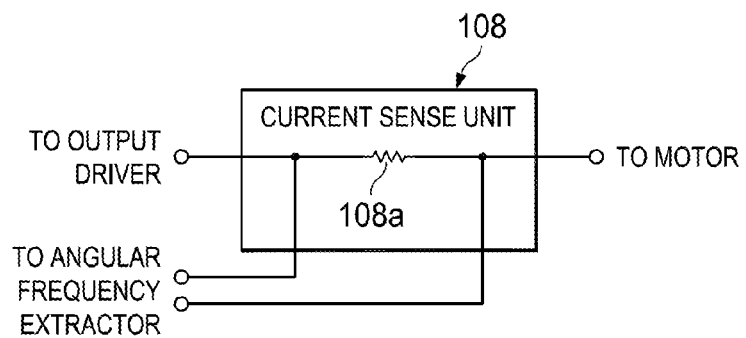
FIG. 4 shows a current sense unit in accordance with an example.
Figure 5:
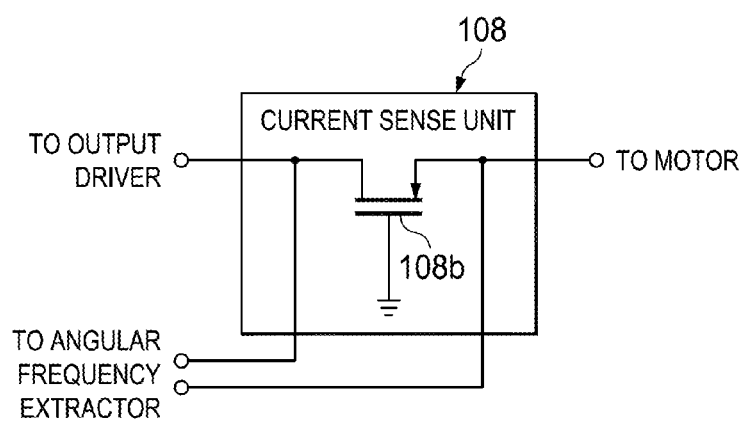
FIG. 5 shows a current sense unit in accordance with another example.

FIGS. 4 and 5 provide examples of implementations of the current sense unit 108 of FIG. 1. In FIG. 4, the current sense unit 108 is implemented as a sense resistor which preferably is a low resistance resistor. The voltage developed across the resistor 108 is proportional to the motor's current amplitude. In FIG. 5, the current sense unit 108 is implemented as field effect transistor (FET) 108b. The source-to-drain voltage of the FET is proportional to the motor's current amplitude.

FIGS. 6a-6e include waveforms of the various signals of FIG. 3. FIG. 6a shows an example of the current sense signal 109 with the various current amplitude discontinuities 160. FIG. 6b illustrates the amplified signal 125. This signal is an amplified version of the derivative of the current sense signal 109. The amplified signal 125 also indicates the occurrence of the current amplitude discontinuities but with spikes that are easier for a timing circuit to measure elapsed time. FIG. 6c illustrates the comparator's output signal 127 which is a series of spikes coincident with each current discontinuity 160 in excess of the threshold 131.

FIG. 6d shows the output voltage pulses from the 1-shot 128. The width of the voltage pulse can be programmed or is fixed but, in either case, is preferably at least just long enough to ensure that the timer 130 does not mistakenly count multiple voltage spikes in quick succession that are associated with the same current amplitude discontinuity 160.

FIG. 6e illustrates the feedback signal 111 from the timer 130. The feedback signal 111 in this example is a voltage whose amplitude is a function of the elapsed time between adjacent voltage pulses from the 1-shot 128. As can be seen the voltage varies somewhat between adjacent pairs of current amplitude discontinuities. For example, the feedback signal voltage at 111a is slightly lower than at 111b. This difference indicates that a slightly longer elapsed time period occurred between the current amplitude discontinuities associated with the voltage at 111b than was the case for the inter-discontinuity time period associated with the voltage at 111a.

Figure 7:
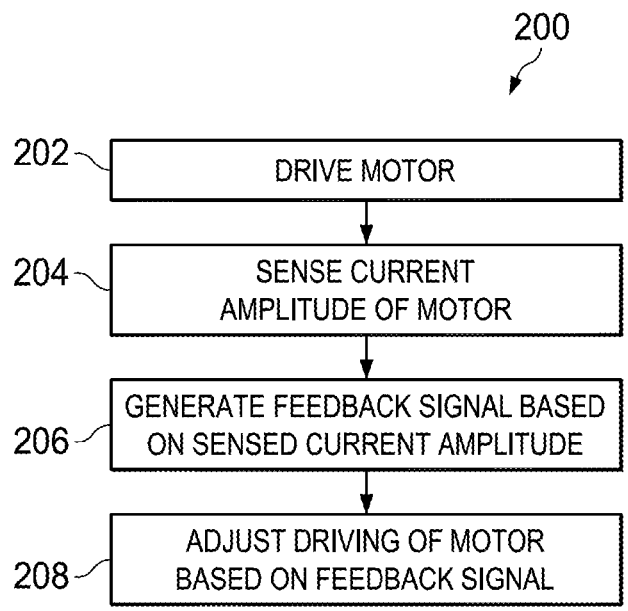
FIG. 7 shows a method in accordance with an example.

FIG. 7 illustrates an example of a method for controlling a motor. The method includes driving the motor at 202 (e.g., by the motor driver 106 providing a voltage to the motor 150). At 204, the method includes sensing the current amplitude of the motor (e.g., via current sense unit 108 and angular frequency extractor 110). At 206, the method includes the angular frequency extractor 1110 generating the feedback signal 111 based on the sensed current amplitude. At 208, the method includes adjusting the driving of the motor based on the feedback signal. For example, the feedback signal 111 may cause the motor driver 106 to increase or decrease its output voltage to make the motor 150 spin faster or slower to make the motor spin at a desired angular frequency.

Figure 8:
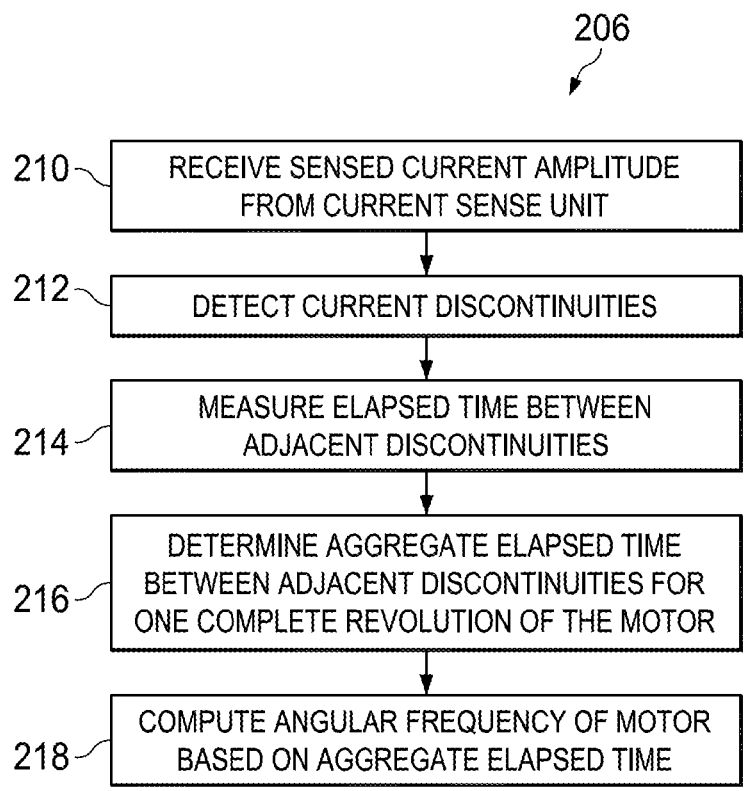
FIG. 8 shows an example of generating a feedback signal in accordance with an example.

FIG. 8 shows an example method to implement operation 206 in FIG. 7 (generating the feedback signal 111). The operations depicted may be performed by the angular frequency extractor 110. At 210, the method includes receiving the sensed current amplitude from the current sense unit 108 at the angular frequency extractor 110. At 212, the method includes detecting the current amplitude discontinuities 160 in the sensed current amplitude. This operation may be performed by conditioning the current sense signal 109 using any one or more of the differentiator 120, amplifier 124, comparator 126, 1-shot 128, and peak detector 132 described above.

At 214, the elapsed time is measured between adjacent discontinuities. This operation may be performed by the timer 130. At 216, the method includes determining the aggregate elapsed time between adjacent discontinuities for one complete revolution of the motor's rotor. The timer 130 then may compute (218) the angular frequency of the motor based on the aggregate of the elapsed time measurements between adjacent discontinuities over one complete revolution of the motor's rotor.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
   a motor driver configured to drive a motor across a pair of input terminals of the motor;
   a current sense unit configured to sense an electrical current amplitude of the motor; and
   an angular frequency extractor operatively coupled to the motor driver and the current sense unit, the angular frequency extractor configured to: detect discontinuities in the electrical current amplitude of the motor, determine a time period of a rotor of the motor based on the detected discontinuities, and generate a feedback signal based on the determined time period to control an angular frequency of the motor, wherein the discontinuities in the motor's electrical current amplitude are detected by generating a derivative output signal of the sensed electrical current amplitude.

2. The apparatus of claim 1 further comprising:
   an error generator configured to generate an error signal based on the feedback signal generated by the angular frequency extractor and a motor control input signal, the error signal being provided as an input to the motor driver.

3. The apparatus of claim 1, wherein the current sense unit includes at least one of a current sense resistor and a field effect transistor.

4. The apparatus of claim 1, wherein the angular frequency extractor is further configured to measure an elapsed time value between adjacent discontinuities in the electrical current amplitude of the motor and to aggregate the elapsed time values between adjacent discontinuities to generate the feedback signal, the aggregated elapsed time values representing one complete revolution of the rotor of the motor.

5. The apparatus of claim 1, wherein the angular frequency extractor comprises:
   a differentiator configured to generate the derivative output signal;
   an amplifier configured to amplify the derivative output signal to generate an amplified signal;
   a comparator configured to compare the amplified signal with a threshold signal to generate a comparator output signal;
   a one-shot configured to generate a voltage pulse based on the comparator output signal, the generated voltage pulse indicating that the amplified signal exceeds the threshold signal; and
   a timer configured to measure a time period of the voltage pulse.

6. The apparatus of claim 5, wherein the angular frequency extractor further comprises:
   a peak detector configured to detect a peak amplitude of the amplified signal for generating a peak detector output signal, and
   wherein the timer is further configured to generate the threshold signal based on the peak detector output signal.

7. The apparatus of claim 1, wherein the feedback signal is proportional to the angular frequency of the motor.

8. The apparatus of claim 1, wherein the angular frequency extractor is further configured to detect discontinuities in the electrical current amplitude of the motor and to determine the time period of the motor's rotor while the motor driver continues to drive the motor.

9. An angular frequency extractor, comprising:
   a differentiator configured to receive a current amplitude signal indicative of an electrical current amplitude of a motor and to generate a derivative output signal based on the received current amplitude signal;
   an amplifier configured to amplify the derivative output signal to generate an amplified signal;
   a comparator configured to compare the amplified signal with a threshold signal to generate a comparator output signal;
   a one-shot configured to generate a voltage pulse based on the comparator output signal, the generated voltage pulse indicating that the amplified signal exceeds the threshold signal; and
   a timer configured to measure a time period of the voltage pulse to generate a feedback signal for use in controlling the motor.

10. The angular frequency extractor of claim 9 further comprising:
    a peak detector configured to detect a peak amplitude of the amplified signal for generating a peak detector output signal, and
    wherein the timer is further configured to generate the threshold signal based on the peak detector output signal.

11. The angular frequency extractor of claim 9, wherein the feedback signal is proportional to an angular frequency of the motor.

12. An apparatus, comprising:
    a motor comprising input terminals;
    a motor driver configured to drive the motor across the input terminals of the motor;
    a current sense unit configured to sense an electrical current amplitude of the motor;
    an angular frequency extractor operatively coupled to the motor driver and the current sense unit, the angular frequency extractor configured to: detect discontinuities in the electrical current amplitude of the motor, determine a time period of a rotor of the motor based on the detected discontinuities, and generate a feedback signal based on the determined time period to control an angular frequency of the motor, the angular frequency extractor comprises:
       a differentiator configured to generate a derivative output signal based on the sensed electrical current amplitude,
       a comparator configured to generate a comparator output signal by comparing a representation of the derivative output signal with a threshold signal, and
       a timer configured to measure a time period associated with the comparator output signal; and
    an error generator configured to generate an error signal based on the feedback signal generated by the angular frequency extractor and a motor control input signal, the error signal being provided as an input to the motor driver.

13. The apparatus of claim 12, wherein the current sense unit includes at least one of a current sense resistor and a field effect transistor.

14. The apparatus of claim 12, wherein the angular frequency extractor is further configured to measure an elapsed time value between adjacent discontinuities in the electrical current amplitude of the motor and to aggregate the elapsed time values between adjacent discontinuities to generate the feedback signal, the aggregated elapsed time values representing one complete revolution of the rotor of the motor.

15. The apparatus of claim 12, wherein the angular frequency extractor further comprises:
    an amplifier configured to receive the derivative output signal and amplify the received derivative output signal to generate an amplified signal, the amplified signal passed to the comparator for comparison with the threshold signal; and
    a one-shot configured to generate a voltage pulse based on the comparator output signal, the generated voltage pulse indicating that the amplified signal exceeds the threshold signal, wherein the timer is further configured to measure the time period associated with the comparator output signal by measuring a time period of the generated voltage pulse.

16. The apparatus of claim 15, wherein the angular frequency extractor further comprising:
    a peak detector configured to detect a peak amplitude of the amplified signal for generating a peak detector output signal, and
    wherein the timer is further configured to generate the threshold signal based on the peak detector output signal.

17. The apparatus of claim 12, wherein the feedback signal is proportional to the angular frequency of the motor.

18. The apparatus of claim 12, wherein the angular frequency extractor is further configured to detect discontinuities in the electrical current amplitude of the motor and to determine the time period of the motor's rotor while the motor driver continues to drive the motor.

19. A method, comprising:
    driving a motor by a motor driver;
    sensing an electrical current amplitude of the motor;
    detecting discontinuities in the sensed electrical current amplitude, the discontinuities detected by generating a derivative output signal of the sensed electrical current amplitude;
    determining a time period of a rotor of the motor based on the detected discontinuities;
    generating a feedback signal based on the determined time period; and
    adjusting the driving of the motor based on the feedback signal.

20. The method of claim 19, wherein generating the feedback signal based on the determined time period comprises measuring an elapsed time between adjacent detected discontinuities.

21. The method of claim 20, wherein generating the feedback signal further comprises determining the aggregate elapsed time between adjacent detected discontinuities for one complete revolution of the motor and computing an angular frequency based on the aggregate elapsed time.

* * * * *